United States Patent
Mayers et al.

(10) Patent No.: US 11,636,203 B2
(45) Date of Patent: Apr. 25, 2023

(54) SYSTEM FOR ISOLATED ACCESS AND ANALYSIS OF SUSPICIOUS CODE IN A DISPOSABLE COMPUTING ENVIRONMENT

(71) Applicant: BANK OF AMERICA CORPORATION, Charlotte, NC (US)

(72) Inventors: Kyle Mayers, Charlotte, NC (US); George Albero, Charlotte, NC (US); Jon Codispoti, La Habra, VA (US); Jinna Zevulun Kim, Charlotte, NC (US); Dustin Paul Stocks, Stallings, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 230 days.

(21) Appl. No.: 16/907,994

(22) Filed: Jun. 22, 2020

(65) Prior Publication Data
US 2021/0397704 A1    Dec. 23, 2021

(51) Int. Cl.
    *G06F 21/55*      (2013.01)
    *G06F 9/455*      (2018.01)

(52) U.S. Cl.
    CPC ............ *G06F 21/554* (2013.01); *G06F 9/455* (2013.01); *G06F 2221/032* (2013.01)

(58) Field of Classification Search
    CPC ...... G06F 21/566; G06F 21/554; G06F 21/53; G06F 2221/032
See application file for complete search history.

(56) References Cited

U.S. PATENT DOCUMENTS

| | | | |
|---|---|---|---|
| 1,044,005 A | 11/1912 | Emmerich | |
| 4,533,996 A * | 8/1985 | Hartung | ............... G06F 12/08 710/3 |
| 5,524,065 A | 6/1996 | Yagasaki | |
| 7,308,648 B1 | 12/2007 | Buchthal et al. | |
| 7,373,667 B1 | 5/2008 | Millard | |
| 7,418,729 B2 | 8/2008 | Szor | |
| 7,487,148 B2 | 2/2009 | James | |
| 7,706,580 B2 | 4/2010 | Houle et al. | |
| 7,788,699 B2 | 8/2010 | Largman et al. | |
| 8,037,535 B2 | 10/2011 | Maloof | |
| 8,230,510 B1 | 7/2012 | Yang et al. | |
| 8,695,100 B1 | 4/2014 | Cosoi | |
| 8,782,174 B1 * | 7/2014 | Dotan | .................. H04L 67/06 709/219 |

(Continued)

*Primary Examiner* — Dao Q Ho
(74) *Attorney, Agent, or Firm* — Moore & Van Allen PLLC; Jeffrey R. Gray

(57) ABSTRACT

Providing an isolation system that allows analysts to analyze suspicious information in a way that aids in preventing harmful information from spreading to other applications and systems on a network. A plurality of virtual containers may be used by analysts to analyze suspicious information. The analyst may set the virtual environment configurations (e.g., applications, programs, settings, etc.) of the virtual container. The analyst may determine how the suspicious information effects the virtual environment configuration and/or use tools to analyze the suspicious information. When harmful information is identified the virtual container may be discarded (e.g., folded up and deleted), and a new virtual container may be provided to the analyst to continue to analyze the suspicious information and/or new suspicious information.

19 Claims, 4 Drawing Sheets

(56) References Cited

U.S. PATENT DOCUMENTS

| | | |
|---|---|---|
| 8,806,619 B2 | 8/2014 | Lomont et al. |
| 9,064,093 B1 | 6/2015 | Felske et al. |
| 9,064,097 B2 | 6/2015 | Sambamurthy |
| 9,189,375 B1 | 11/2015 | Bastien et al. |
| 9,218,489 B2 | 12/2015 | Mooring et al. |
| 9,424,426 B2 | 8/2016 | Payne et al. |
| 9,465,941 B2* | 10/2016 | Wang .................... G06F 21/566 |
| 9,607,151 B2 | 3/2017 | Mooring et al. |
| 9,672,355 B2 | 6/2017 | Titonis et al. |
| 9,876,812 B1* | 1/2018 | Liu .................... H04L 63/1416 |
| 10,318,730 B2 | 6/2019 | Treadwell |
| 10,360,184 B2 | 7/2019 | Jerrard-Dunne et al. |
| 10,360,185 B2 | 7/2019 | Jerrard-Dunne et al. |
| 10,402,216 B1 | 9/2019 | Bell et al. |
| 10,445,572 B2 | 10/2019 | Mulder |
| 10,460,099 B2 | 10/2019 | Golovkin et al. |
| 10,482,239 B1 | 11/2019 | Liu et al. |
| 10,489,592 B1 | 11/2019 | Naamneh et al. |
| 10,498,760 B1 | 12/2019 | Hussain et al. |
| 10,511,617 B2 | 12/2019 | Zou et al. |
| 10,534,906 B1* | 1/2020 | Paithane ............... G06F 21/566 |
| 10,542,040 B2 | 1/2020 | Beskrovny et al. |
| 10,671,726 B1 | 6/2020 | Paithane et al. |
| 11,240,275 B1 | 2/2022 | Vashisht et al. |
| 2009/0300761 A1 | 12/2009 | Park et al. |
| 2011/0271342 A1 | 11/2011 | Chung et al. |
| 2013/0055256 A1* | 2/2013 | Banga ................ G06F 9/45533 718/1 |
| 2014/0026214 A1 | 1/2014 | Adams et al. |
| 2014/0337836 A1* | 11/2014 | Ismael .................. H04L 63/145 718/1 |
| 2015/0067862 A1* | 3/2015 | Yu .......................... G06F 21/56 726/24 |
| 2016/0036849 A1 | 2/2016 | Zakian |
| 2016/0210164 A1 | 7/2016 | Kruglick |
| 2016/0212156 A1 | 7/2016 | Choi et al. |
| 2016/0212157 A1 | 7/2016 | Choi et al. |
| 2016/0292420 A1* | 10/2016 | Langton ................. G06F 21/53 |
| 2016/0328742 A1* | 11/2016 | Shiravi Khozani ..... G06F 21/53 |
| 2017/0032120 A1* | 2/2017 | Tol ........................ G06F 21/53 |
| 2017/0098071 A1* | 4/2017 | Stopel .................. G06F 21/554 |
| 2017/0344740 A1 | 11/2017 | Langton et al. |
| 2018/0048660 A1* | 2/2018 | Paithane ............... G06F 21/566 |
| 2018/0068115 A1* | 3/2018 | Golovkin ............. G06F 21/566 |
| 2018/0336351 A1 | 11/2018 | Jeffries et al. |
| 2018/0365420 A1 | 12/2018 | Krylov et al. |
| 2019/0294778 A1 | 9/2019 | De Gaetano et al. |
| 2021/0240825 A1 | 8/2021 | Kutt et al. |
| 2021/0256126 A1 | 8/2021 | Yan |
| 2021/0397704 A1* | 12/2021 | Mayers ................. G06F 21/554 |
| 2022/0083661 A1* | 3/2022 | Ma .......................... G06N 5/01 |

\* cited by examiner

SYSTEM FOR ISOLATED ACCESS AND ANALYSIS OF SUSPICIOUS CODE IN A DISPOSABLE COMPUTING ENVIRONMENT

FIELD

The present invention relates to a security system for isolating suspicious information, and more particularly to an isolation system that allows for analysts to analyze suspicious information in a disposable container that is separate from other containers and the systems of the organization, and that can be disposed of and replaced when harmful information is identified.

BACKGROUND

Security systems have been utilized in order to identify harmful code in information accessed (e.g., received, retrieved, opened, or the like) by users manually or automatically by systems. However, traditional security system may result in harmful code spreading to the other systems in the organization or may require expensive, time consuming, and restrictive measure that hamper the operations of the organization.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for a security system that provides an isolation system that allows analysts to analyze suspicious information in a way that aids in preventing harmful information from spreading to other applications and systems on a network. A plurality of virtual containers may be used by analysts to analyze suspicious information. The analyst may set the virtual environment configurations (e.g., applications, programs, settings, etc.) of the virtual container. The analyst may determine how the suspicious information effects the virtual environment configuration and/or use tools to analyze the suspicious information. When harmful information is identified the virtual container may be discarded (e.g., folded up and deleted), and a new virtual container may be provided to the analyst to continue to analyze the suspicious information and/or new suspicious information.

Embodiments of the invention comprise isolating and analyzing suspicious information in disposable virtual containers using an isolation system. The isolation system receives an indication of the suspicious information and allows an analyst user access to a first disposable virtual container in order to analyze the suspicious information. The isolation system allows the analyst user to analyze the suspicious information within the first disposable virtual container. When the suspicious information is identified as including harmful information, the first disposable virtual container is discarded. After the first disposable virtual container is discarded the analyst user is allowed access to a second disposable virtual container.

In further accord with embodiments of the invention, the second disposable virtual container is a replacement container for the first disposable virtual container.

In other embodiments, the invention further comprises allowing the analyst user to analyze the suspicious information within the second disposable virtual container.

In still other embodiments, the invention further comprises bypassing the harmful information when analyzing the suspicious information within the second disposable virtual container.

In yet other embodiments, the invention further comprises discarding the first disposable virtual container comprises folding up and deleting the first disposable virtual container.

In other embodiments, the invention further comprises identifying the suspicious information fails to include the harmful information and sending a notification to a target user that the suspicious information is cleared when the harmful information fails to be identified.

In further accord with embodiments of the invention, the indication of the suspicious information is received from a target user.

In other embodiments of the invention, the indication of the suspicious information is received automatically from an organization system.

In still other embodiments of the invention, the system is an isolation system that provides physical separation and logical separation when analyzing the suspicious information.

In yet other embodiments of the invention, the isolation system is accessed through an application programming interface located on an analyst computer system, on the isolation system, or on an application programing interface system.

In other embodiments, the invention further comprises creating a plurality of virtual containers for a plurality of analysts, wherein each of the plurality of virtual containers are specific to each of the plurality of analysts.

In further accord with embodiments, the invention further comprises creating a virtual container when the analyst user accesses the system.

In other embodiments, the invention further comprises receiving virtual environment configurations from the analyst user for the first disposable virtual container for the suspicious information or automatically based on configurations of a target user computer system of a target user that received the suspicious information.

In still other embodiments, the invention further comprises implementing a mitigation action when the suspicious information is determined to include the harmful information.

In yet other embodiments of the invention, the mitigation action comprises sending a notification to a user when the harmful information is identified.

In other embodiments of the invention, the mitigation action comprises requesting removal of the harmful information from a target user computer system, allowing the analyst user access to a target user computer of a target user to remediate the harmful information, requiring a username or password change, notifying other analyst users of the harmful information, notifying other users within an organization of the harmful information, notifying a third-party of the harmful information, blocking a website for the harmful information, preventing future download of the harmful information, or automatically deleting any future communications with the harmful information.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
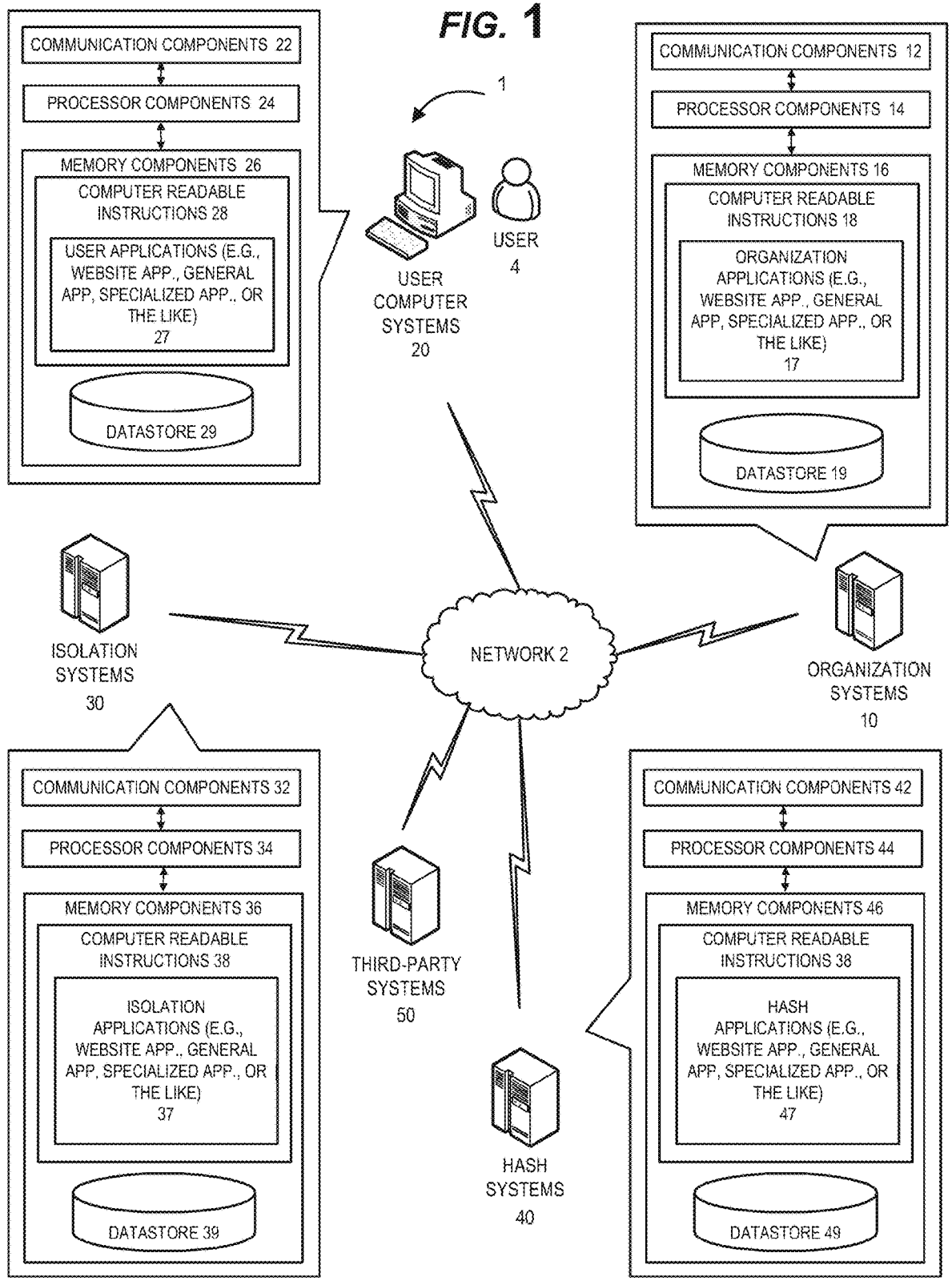

Having thus described embodiments of the invention in general terms, reference will now be made to the accompanying drawings, and wherein:

FIG. 1 illustrates a block system diagram of a suspicious information system environment, in accordance with embodiments of the present disclosure.

Figure 2:
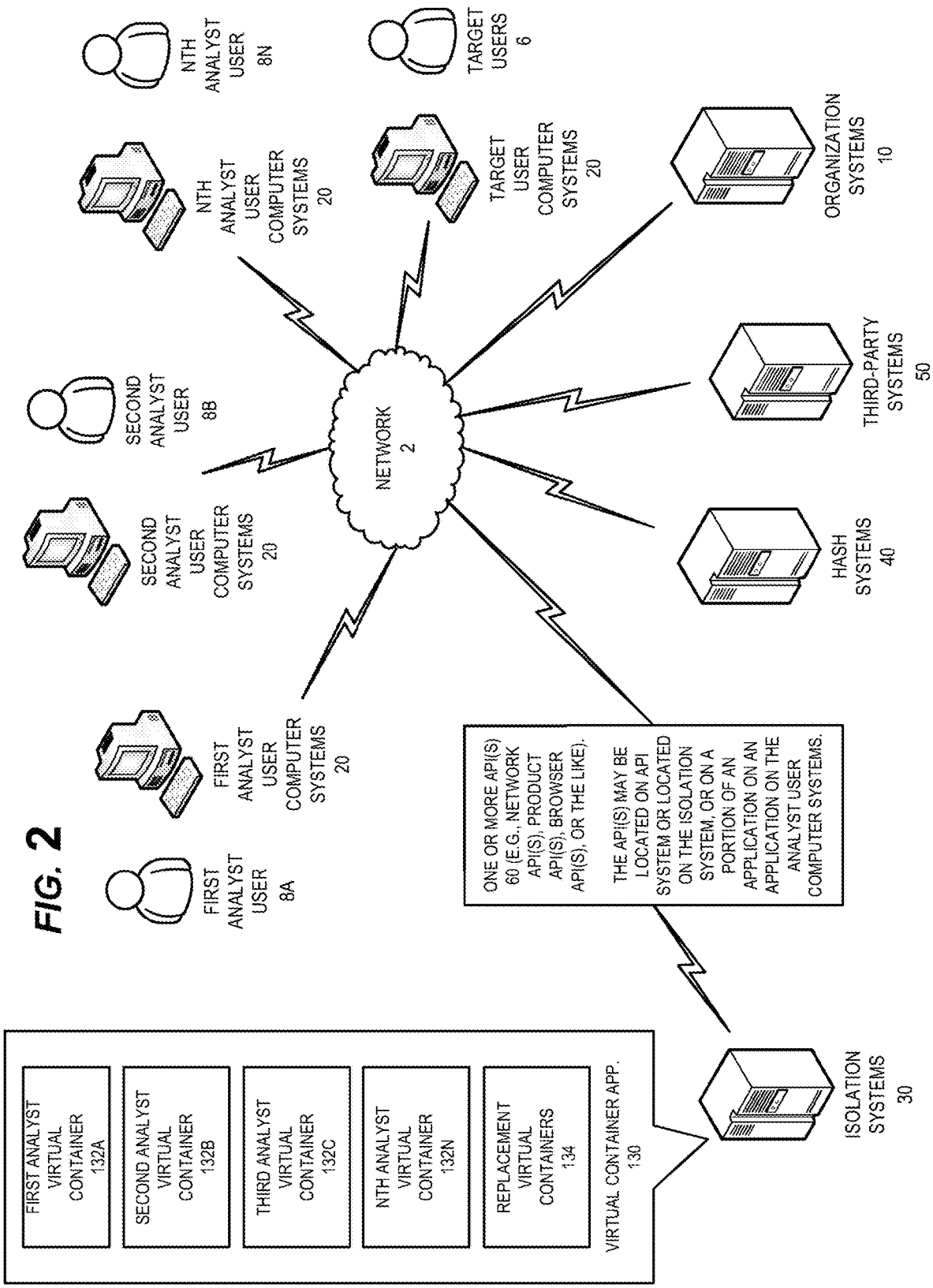

FIG. 2 illustrates a block system diagram of a suspicious information system environment, in accordance with some embodiments of the present disclosure.

Figure 3:
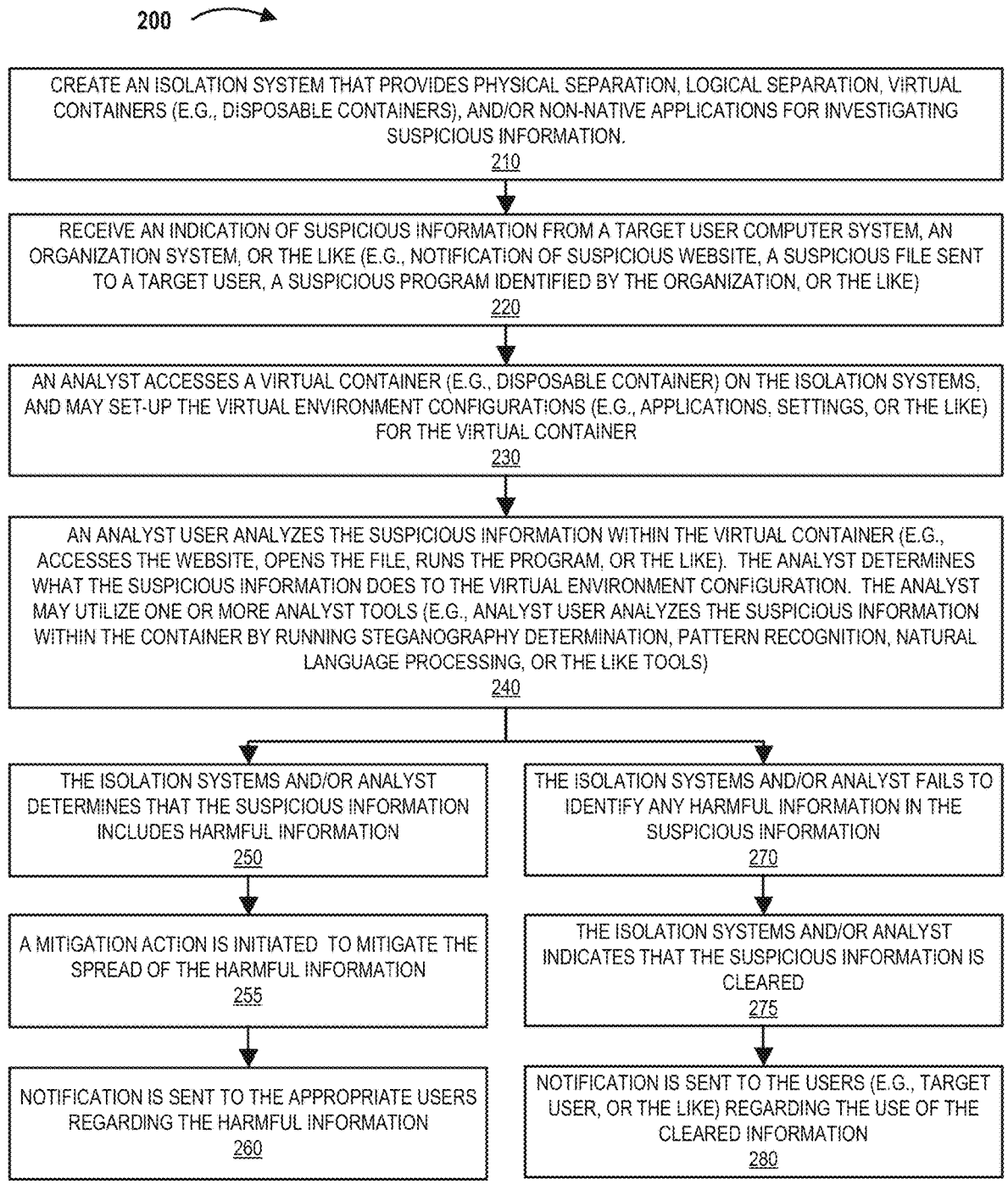

FIG. 3 illustrates a process flow for utilizing the isolation systems in order to analyze suspicious information to determine if such suspicious information has harmful information, in accordance with some embodiments of the present disclosure.

Figure 4:
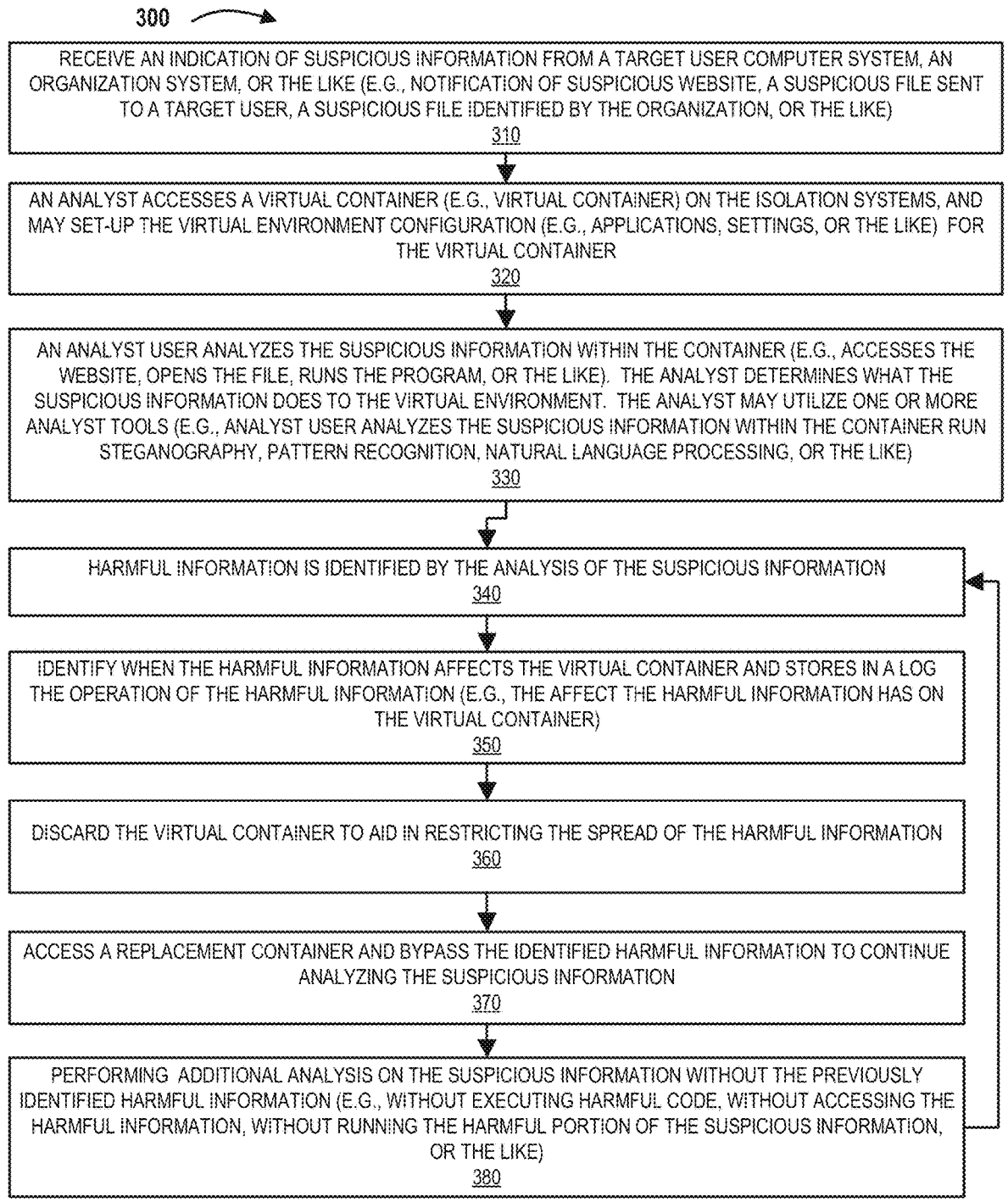

FIG. 4 illustrates a process flow for utilizing a disposable container within the isolation systems and to discard the disposable container should harmful information be identified within the suspicious information be identified, in accordance with some embodiments of the present disclosure.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are described herein for a security system that provides an isolation system that allows analysts to analyze suspicious information in a container that is separate from other containers in the isolation system and the systems of the organization. The invention aids in identifying harmful information from suspicious information, and aids in preventing harmful information from spreading to other containers and/or systems of the organization.

FIG. 1 illustrates a suspicious information system environment 1, in accordance with embodiments of the present disclosure. As illustrated in FIG. 1, one or more organization systems 10 are operatively coupled, via a network 2, to one or more user computer systems 20, one or more isolation systems 30, one or more hash systems 40, one or more third-party systems 50, and/or one or more other systems (not illustrated). In this way, the isolation systems 30 (in coordination with the user computer systems 20 and/or other systems on the network 2) may be utilized to analyze suspicious information to determine if it includes harmful information or if it is safe information. For example, as will be described herein the suspicious information being analyzed may be documents (e.g., text documents, spreadsheet documents, compound documents, or other like documents), zip files, meta data, content that includes macros, file headers and extensions, Java files, code (e.g., source, object, executable, or the like code), website, links, platforms, unsupported file types, attachments, embedded documents, and/or any other type of information. As will be described herein, the isolation systems 30 and/or other systems described herein may utilize physical separation, logical separation, virtual containers for one or more analyst users 8 (also described as an "analyst"), and/or non-native applications for analyzing the information within the isolation systems 30.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processing components 14, and one or more memory components 16. The one or more processing components 14 are operatively coupled to the one or more communication components 12 and the one or more memory components 16.

As used herein, the term "processing component" (otherwise described as a "processor," "processing device," or the like) generally includes circuitry used for implementing the communication and/or logic functions of a particular system. For example, a processing component may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components may include functionality to operate one or more software programs based on computer-readable instructions thereof, which may be stored in the one or more memory components.

A processing component may be configured to use a network interface to communicate with one or more other components on the network 2. In this regard, the network interface may include an antenna operatively coupled to a transmitter and a receiver (together a "transceiver"). The processing component may be configured to provide signals to and receive signals from the transmitter and receiver, respectively. The signals may include signaling information in accordance with the air interface standard of the applicable cellular system of the wireless telephone network that may be part of the network 2. In this regard, the systems may be configured to operate with one or more air interface standards, communication protocols, modulation types, and access types. By way of illustration, the components may be configured to operate in accordance with any of a number of first, second, third, fourth, fifth-generation communication protocols, and/or the like. For example, the computing systems may be configured to operate in accordance with second-generation (2G) wireless communication protocols IS-136 (time division multiple access (TDMA)), GSM (global system for mobile communication), and/or IS-95

(code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The components may also be configured to operate in accordance with non-cellular communication mechanisms, such as via a wireless local area network (WLAN) or other communication/data networks.

The network interface may also include an application interface in order to allow an entity to execute some or all of the processing described herein. The application interface may have access to the hardware (e.g., the transceiver, and software previously described with respect to the network interface). Furthermore, the application interface may have the ability to connect to and communicate with an external data storage on a separate system within the network 2.

The communication components may include an interface for a wireless transceiver, modem, server, electrical connection, electrical circuit, or other component for communicating with other components on the network 2. The communication components may have an interface that includes user output devices and/or input devices. The input and/or output devices may include a display (e.g., a liquid crystal display (LCD) or the like) and a speaker or other audio device, which are operatively coupled to the processing components. The input devices, which may allow the devices to receive data from a user, may further include any of a number of devices allowing the devices to receive data from a user, such as a keypad, keyboard, touch-screen, touchpad, microphone, mouse, joystick, other pointer device, button, soft key, and/or other input device(s).

As such, the one or more processing components 14 of the one or more organization systems 10 use the one or more communication components 12 to communicate with the network 2 and other components on the network 2, such as, but not limited to, the components of the one or more user computer systems 20, the one or more isolation systems 30, the one or more hash systems 40, the one or more third-party systems 50, and/or the one or more other systems (not illustrated).

As further illustrated in FIG. 1, the one or more organization systems 10 comprise computer-readable instructions 18 stored in the one or more memory components 16, which in some embodiments includes the computer-readable instructions 18 of the one or more organization applications 17 (e.g., website application, general application, specialized application, a portion of the foregoing, or the like). In some embodiments, the one or more memory components 16 include one or more data stores 19 for storing data related to the one or more organization systems 10, including, but not limited to, data created, accessed, and/or used by the one or more organization applications 17. The organization may be an entity that administers, controls, or regulates the network 2, the user computer systems 20, the isolation systems 30, and/or the hash systems 40. It should be understood that the users 4, third-parties, and organizations described herein may all be referred to herein as entities.

As illustrated in FIG. 1, users 4 may communicate with each other and the other systems over the network 2 as will be described in further detail herein. In some embodiments the users 4 may be target users 6 (also described herein as "targets") that may be the target of suspicious information that includes suspicious code (e.g., harmful code, links to websites used to misappropriate information, applications that try to access user or organization information, or the like). In particular "suspicious information" as used herein may refer to information that may potentially include a computer virus, worm, trojan horse, spyware, adware, back door, malware, time bomb, or the like whose purpose is to damage or interfere with a target computer system and/or other systems and/or access information through accessing a target computer system and/or other systems. "Malware" as defined herein may refer to executable code which may cause the execution of one or more unwanted or unauthorized processes on a target computing system (e.g., deleting or corrupting files, modifying data, encrypting files, or the like). "Time bomb" as used herein may refer to a specific type of harmful code that may execute unwanted or unauthorized processes upon detecting the occurrence of certain specific conditions. Examples of such conditions may include the occurrence of a particular date, the passage of a designated amount of time, execution of certain operations, or the like. Furthermore, "harmful information" as used herein may refer to suspicious information that is confirmed to have a computer virus, worm, trojan horse, spyware, adware, back door, malware, time bomb, or the like whose purpose is to damage or interfere with a target computer system and/or other systems and/or access information through accessing a target computer system and/or other systems.

Some users, such as target users 6, may receive information that may be suspicious information (e.g., e-mail, files, from websites being visited, links selected, programs downloaded, or the like) from the third-party systems 50. Other users 4, such as analyst users 8, may be tasked with reviewing the suspicious information received by the target users 6 to confirm whether or not the suspicious information includes harmful information. The analyst users 8 may analyze the suspicious information through the use of the isolation systems 30, as will be described in further detail herein. In some embodiments, the analyst users 8 may communicate with the target users 6 to receive the suspicious information to analyze, may receive the suspicious information to analyze from the organization systems 10 automatically, the analyst users 8 may receive suspicious information to analyze directly from third-party systems 50 over the network 2, and/or access (e.g., receive, select, or the like) the suspicious information in other ways.

The analyst users 8 may communicate with the isolation systems 30 over the network 2 through one or more application processing interfaces (APIs), which may be located on a separate API system, may be located on the isolation systems 30, and/or may be located on the analyst user computer systems 20. In some embodiments the analyst user computer systems 20 may include a portion of the isolation application 37 as the user computer application 27, such as an applet that may be used to communicate with the isolation systems 30. In other embodiments of the invention, the analyst user computer systems 20 may communicate with the isolation application 37 through a user computer application 27, such as a web browser, or the like. The one or more users 4 described herein may be individual users and/or employees, agents, representatives, officers, or the like of the organization on the network 2 (e.g., target users 6, analyst users 8, or the like).

The user computer systems 20 may communicate with each other, the one or more organization systems 10, the one or more isolation systems 30, the one or more hash systems 40, the one or more third-party systems 50, and/or other systems (not illustrated). The one or more user computer systems 20 may be a desktop, laptop, tablet, mobile device (e.g., smartphone device, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the one or more organization systems 10, the one or more isolation systems 30, the one or more hash systems 40, the one or more third-party systems 50, and/or the other systems (not illustrated).

As illustrated in FIG. 1, the one or more user computer systems 20 may have computer-readable instructions 28 stored in the one or more memory components 26, which in some embodiments includes the computer-readable instructions 28 for user applications 27, such as general applications, dedicated applications (e.g., apps, applet, or the like), portions of dedicated applications, a web browser or other apps that allow access to applications located on other systems, or the like. In some embodiments, the one or more memory components 26 include one or more data stores 29 for storing data related to the one or more user computer systems 20, including, but not limited to, data created, accessed, and/or used by the one or more user computer systems 20. The user application 27 may use the applications of the one or more organization systems 10, the one or more isolation systems 30, the one or more third-party systems 40, and/or one or more other systems (not illustrated) in order to communicate with other systems on the network and take various actions within the isolation systems 30 to analyze suspicious information and identify harmful information, as will be described in further detail herein.

As illustrated in FIG. 1, the one or more isolation systems 30 may be utilized by the one or more organization systems 10, the one or more user computer systems 20, the one or more hash systems 40, the one or more third party systems 50, and/or other systems to aid in allowing analyst users 8 to use to the isolation systems 30 to analyze suspicious information (e.g., suspicious information received by the target users 6 from third parties, or the like) to identify harmful information. That is, the isolation systems 30 may be utilized to create virtual containers 130 in which suspicious information may be analyzed by the analyst users 8 using various tools depending on the type of suspicious information (e.g., source code, file, link, program, or the like) being analyzed and how the suspicious information is going to be utilized by the organization systems 10 and/or the user computer systems 20 (e.g., installed locally, temporarily utilized, utilized for public information, utilized for confidential information, the user 4 that will utilize the suspicious information, or the like). "Virtual containers" as used herein may refer to a computing environment that may be physically and/or logically isolated from other environments and/or computing systems within the network 2. "Virtual container instance" as used herein may refer to a particular use of a virtual container that may be created for a given time period and/or for a given analyst user 8. Each virtual container instance may have separately allocated processes, system files, drivers, and applications, which may be defined automatically and/or by the analyst user 8 to which the container is assigned. "Virtual environment configuration" as used herein may refer to the applications, programs, operating systems, data and/or the settings thereof that are set-up in the virtual container in order to analyze the suspicious information in a particular environment. Accordingly, processes or code that may be executed within a virtual container instance will only effect the state of the virtual container instance. Moreover, as will be discussed with respect to the one or more hash systems 40, hashing may be used to identify past suspicious information that had been identified as harmful information, and to hash newly identified harmful information and store the hash for the harmful information for future use.

The one or more isolation systems 30 are operatively coupled, via a network 2, to the one or more organization systems 10, the one or more user computer systems 20, the one or more hash systems 40, the one or more third-party systems 50, and/or the other systems (not illustrated). The one or more isolation systems 30 generally comprise one or more communication components 32, one or more processing components 34, and one or more memory components 36.

The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of the one or more organization systems 10, the one or more user computer systems 20, the one or more hash systems 40, the one or more third-party systems 50, and/or the one or more other systems (not illustrated).

As illustrated in FIG. 1, the one or more isolation systems 30 may have computer-readable instructions 38 stored in the one or more memory components 36, which in one embodiment includes the computer-readable instructions 38 of one or more isolation applications 37. In some embodiments, the one or more memory components 36 include one or more data stores 39 for storing data related to the one or more isolation systems 30, including, but not limited to, data created, accessed, and/or used by the one or more isolation applications 37. The one or more isolation applications 37 may allow for analyzing suspicious information for identifying harmful information, as previously described and as will be described in further herein.

As illustrated in FIG. 1, one or more hash systems 40 may be utilized by the one or more organization systems 10, the one or more user computer systems 20, the one or more isolation systems 30, the one or more third party systems 50, and/or other systems (not illustrated) to aid in providing storage of information that has been reviewed and hashed in order use the hashed information to reduce the need to analyze other suspicious information in the future. Instead, the hashed information may be used to quickly identify suspicious information that is harmful information without the need to analyze the suspicious information on the isolated systems 30, as will be discussed in further detail herein. Moreover, the one or more hash systems 40 are used to hash newly identified harmful information and store the hash in the hash systems 40.

The one or more hash systems 40 are operatively coupled, via a network 2, to the one or more organization systems 10, the one or more user computer systems 20, the one or more isolation systems 30, the one or more third-party systems 50, and/or the other systems (not illustrated). The one or more hash systems 40 generally comprise one or more communication components 42, one or more processing components 44, and one or more memory components 46.

The one or more processing components 44 are operatively coupled to the one or more communication components 42, and the one or more memory components 46. The one or more processing components 44 use the one or more communication components 42 to communicate with the network 2 and other components on the network 2, such as, but not limited to, the components of the one or more organization systems 10, the one or more user computer systems 20, the one or more isolation systems 30, the one or more third-party systems 50, and/or the one or more other systems (not illustrated).

As illustrated in FIG. 1, the one or more hash systems 40 may have computer-readable instructions 48 stored in the one or more memory components 46, which in one embodiment includes the computer-readable instructions 48 of one or more hash applications 47. In some embodiments, the one or more memory components 46 include one or more data stores 49 for storing data related to the one or more hash systems 40, including, but not limited to, data created, accessed, and/or used by the one or more hash applications 47. The one or more hash applications 47 may create and store the hashes for harmful information that are identified (or for hashing suspicious information that has been cleared), and subsequent accessing of the hashes in order to determine if future suspicious information has been previously hashed (e.g., as harmful information, acceptable information, or the like), as will be described in further detail herein.

Moreover, as illustrated in FIG. 1, the one or more third-party systems 50 and/or other systems are operatively coupled to the one or more organization systems 10, the one or more user computer systems 20, the one or more isolation systems 30, and/or the one or more hash database systems 40, through the network 2. The one or more third-party systems 50 and/or other systems, have components the same as or similar to the components described with respect to the one or more organization systems 10, the one or more user computer systems 20, the one or more isolation systems 30, and/or the one or more hash systems 40 (e.g., one or more communication components, one or more processing components, and one or more memory components with computer-readable instructions of one or more third-party applications, one or more datastores, or the like). Thus, the one or more third-party systems 50 and/or other systems communicate with the one or more organization systems 10, the one or more user computer systems 20, the one or more isolation systems 30, the one or more hash systems 40, and/or each other in same or similar way as previously described with respect to the one or more organization systems 10, the one or more user computer systems 20, the one or more isolation systems 30, and/or the one or more hash systems 40. The one or more third-party systems 50 and/or other systems may comprise the systems that are authorized to access the network 2 for various reasons (e.g., to perform maintenance, enter interactions, support the organization systems, or the like). In still other embodiments, the third-parties may be external systems on external networks that are trying to inject harmful information to the other systems on the network 2 (e.g., the organization systems 10, the user computer systems 20, the isolation systems 30, the hash systems 40, or the like). The one or more other systems (not illustrated) may include the systems, and components thereof, for allowing communications between the systems (e.g., intermediaries to allow communication between the systems).

FIG. 2 illustrates a block system diagram of a suspicious information system environment 1, in accordance with embodiments of the present disclosure. As illustrated in FIG. 2, the network 2 illustrates that that one or more analyst users 8 may use the analyst computer systems 20 to communicate over the network 2 with the target user computer systems 20 of target users 6, the isolation systems 30, the hash database systems 40, or other systems as previously described with respect to FIG. 1. As illustrated in FIG. 2, the analyst users 8 may communicate with the isolation systems 30 through the use of one or more APIs 60. It should be understood that the one or more APIs 60 may be network APIs (e.g., to operate on the network 2), product APIs (e.g., associated with the isolation application 37), browser API(s) (e.g., to communicate with the isolation systems 30), or the like. In some embodiments the API(s) may be located on an API system (not illustrated) that allows communication from systems on the network 2 to the isolation system 30 located off of the network 2. In some embodiments, the API(s) may be located within the isolation systems 30. In some embodiments the API(s), may be located on each analyst user computer system 20, such that only the analyst users 8 operating the analyst user computer systems 20 are able to communicate with the isolation systems 30.

As further illustrated in FIG. 2, the isolation systems 30 may further comprise one or more container applications 130 that support one or more virtual containers 132. The one or more virtual containers 132A-N may be used by the analysts 8 to analyze the suspicious information received from the target users 6 (e.g., from third party systems 50), automatically from the organization systems 10 (e.g., as the organization systems 10 receive information from third-party systems 50), directly from the third-party systems 50, and/or other like source either manually or automatically. For example, the suspicious information may be analyzed to identify if it is, or includes, harmful information, and may include a file that is attached to an e-mail received by the target user 6. Alternatively, the information may be a web-site, link, or application that a target user 6 is trying to access. Either the target 6 manually, or the organization systems 10 and/or the target user computer systems 20 automatically, send the suspicious information to the analysts 8 for investigation.

In some embodiments the analyst 8 (e.g., a first analyst user 8A, a second analyst user 8B, or an Nth analyst user 8N) may have a specific container (e.g, a first analyst container 132A, a second analyst container 132B, an Nth analyst container 132N). As such, each analyst 8 may use their individual container 132 to investigate the suspicious information. For example, each container 132 may allow each respective analyst 8 to mount and analyze the suspicious information to determine if it is harmful information, such as mounting documents (e.g., composition docs, or the like), metadata information, zip documents, content without macro enablement, view file headers without opening, preform extension compare, execute macro code, operate Java, run other executable code, review platforms (e.g., for corrupt, malformed, unsupported file types—such as, custom signatures, or the like), view hex, view binary, conduct string searches, view URLs in emails and documents, view attachments, open embedded documents, access websites and applications, or the like. The analyst 8 and/or analyst computer system 20 may also run steganography determination, pattern recognition, natural language processing, and/or utilize other tools in order to analyze the suspicious information to identify harmful information. Moreover, as will be described herein, when harmful information is identified through the use of the virtual containers 132, the containers 132 may be discarded (e.g., folded up and deleted from the isolation system 30). A new replacement container 134 may be created and/or provided to the analyst 8 to allow the analyst 8 to continue analyzing the suspicious information or new suspicious information, as will be described in further detail herein.

As will also be described herein in further detail, the analyst computer systems 20 and/or the isolation systems 30 may be utilized to manually and/or automatically create hashes for the harmful information identified or for the acceptable information (e.g., safe, or the like) identified. For example, if harmful code is identified, the isolation systems 30 and/or hash database system 40 may input the harmful code into a data transformation algorithm to produce a data output for the specific harmful code identified. "Data transformation algorithm," as used herein may refer to a set of logical and/or mathematical operations or processes that may be executed on a specified segment of data to produce a transformation output. Accordingly, in some embodiments, the data transformation algorithm may be a cryptographic hash function or hash algorithm (e.g., MD5, Secure Hash Algorithm/SHA, or the like) which, given a specified data input, produces a cryptographic hash output value (e.g., a fixed-length character string, or the like). For instance, the data transformation algorithm may be a hash algorithm such as SHA such that a hash output is generated from the harmful code. The hash output associated with the harmful code may then be stored in in the hash systems 40, and used for future comparisons, as will be discussed herein.

Once the hash database is generated, new sets of information, or code thereof, may be hashed to produce new hash outputs. In such embodiments, if the hash of particular suspicious information matches a hash found within the hash database (e.g., unauthorized hash database), the hash system 40, isolation system 30, and/or other system may automatically send a notification to the analyst 8 and/or other user 4. As such, the one or more systems may be used to flag other suspicious information on the network 2 as harmful information without an analyst 8 having to analyze such suspicious information using the isolation systems 30 or other systems on the network 2. Moreover, in some embodiments the implementation of the harmful information, such as the harmful code (e.g., installation and/or execution of a set of suspicious code) may be prevented through the use of the isolation systems 30 and/or hash systems 40. Consequently, the one or more systems discussed herein may recognize the harmful information without the analysts 8 having to analyze the suspicious information, or by reducing the amount of analysis that the analysts 8 have to perform on the suspicious information. For example, since the suspicious information has already been identified as having harmful information in the past and has been hashed, the analyst 8 may not need to perform the same investigation that the analyst 8 would typically do to investigate the suspicious information.

FIG. 3 illustrates a process for utilizing the isolation systems 30 in order to analyze suspicious information to determine if such suspicious information has harmful information (e.g., is, or includes, harmful code, or the like). As illustrated by block 210 of FIG. 3, an isolation system 30 is created that has physical separation, logical separation, virtual containers (e.g., otherwise described as disposable containers), and/or non-native applications used for investigating suspicious information (e.g., accessing the suspicious information in a non-native format using a non-native application instead of in an original format using the original intended application).

It should be understood that the physical separation of the isolation systems 30 may include locating the isolation systems 30 apart from the organization systems 10 and applications 17 through which the organization operates the business. In this way, any harmful information identified in the virtual containers 132 on the isolation systems 30 is less likely to infiltrate the organization systems 10 or other systems on the network 2. For example, the physical separation may include separating the isolation systems 30 from any other systems and applications that are used to develop and/or implement new or updated systems and applications from. The development systems and applications (e.g., used to develop code), test systems and applications (e.g., for testing programs), pre-production and production systems and applications (e.g., for developing and/or implementing applications, and operating the business) and/or other systems are kept physically separate (e.g., on other networks, are not allowed to communicate with each other, or the like) so that any harmful information identified in the virtual containers 132 within the isolation systems 30 may be restricted from infiltrating the development, implementation, and production organization systems. As such, in some embodiments, the isolation systems 30 may by physically separated from other systems on the network 2 described with respect to FIGS. 1 and 2 by utilizing completely different hardware components, software components, storage databases, security systems, and/or networks.

The logical separation may include utilizing software to separate the isolation applications 37, the virtual containers 132, isolation data, and/or other portions of the isolation systems 30. In some embodiments the logical separation may include providing conceptual separation from the network 2 and providing separate security (e.g., firewalls, protocols, network traffic routing, subnetting, different administrative rights, or the like) to access the isolation systems 30. In this way the isolations systems 30 are also separated from the systems on the network 2 through the use of software.

One or more virtual container applications 130 may be utilized to provide a plurality of virtual containers 132 for the analysts 8, in order to provide a virtual instance in which to each analyst 8 may investigate suspicious information to determine if it include harmful information. In some embodiments each virtual container 132A-N is specific for each analyst 8. Moreover, the virtual containers 132A-N are physically separated (e.g., on one or more isolation systems 30) and/or logically separated (e.g., separated by software, or the like). For example, each virtual container 132A-N may have its own applications, programs, libraries, data, configuration files, or the like, which each analyst 8 may set to create a virtual environment configuration in order to analyze suspicious information within each container 132. As such, an analyst 8 may set different virtual environment configurations depending on in which virtual environment configuration the analyst 8 would like to analyze the suspicious information. As will be described herein, should harmful information be identified within a particular virtual container 132A-N, the virtual container 132A-N may be discarded (e.g., folded up and deleted from the isolation system 30) and a replacement virtual container 134 may be created for the analyst 8.

Additionally, non-native applications may be utilized to investigate suspicious information to identify harmful information. Harmful information is typically created for a particular application, using a particular file type, code, or the like. When the harmful information is accessed using the original application intended for the harmful information, the harmful information is able to infiltrate the application and/or system that is accessing the harmful information, and potentially allow it to spread to other applications or systems. However, the non-native application (e.g., an alternate application that is different from the original application in which the harmful information was intended to operate) may be used to access the suspicious information, such that any harmful information located within the suspicious information is unable to infiltrate the application and/or system because it was not intended to be accessed with the non-native application. In one example, the present invention may access the suspicious information in an HTML format using a web browser instead of using an original application for which the suspicious information was created. In other embodiments, the suspicious information may be accessed in a text format, binary format, hex format, or the like and may be accessed using an application that allows the analyst user 8 to view the file but not run code embedded in the file, or the like. In another particular example, the suspicious information may be a spreadsheet file for a first spreadsheet application that may include a macro that contains harmful code that will execute when opened using the original spreadsheet application (e.g., that may automatically run the macro). However, the non-native application may be a second spreadsheet application or another type of application (e.g., browser application, or the like) for which the harmful macro is not able to run. Consequently, when the suspicious information is accessed using the non-native application, the harmful macro cannot run, but the analyst user 8 may be able to review the code of the harmful information in the analysis format. In this way, by utilizing non-native applications to analyze the suspicious information, an analyst user 8 can analyze the suspicious information while reducing the chance for any harmful information to infiltrate the systems and/or applications of the organizations since the harmful information is being accessed (e.g., viewed, or the like) using a non-native application that does not support the harmful information.

Returning to FIG. 3, as illustrated in block 220, the system may receive an indication of suspicious information from a target user computer system 20 (e.g., target user 6 may manually, or the target user computer system 20 may automatically, notify the isolation systems 30 and/or an analyst user computer systems 20); from the organization systems 10 (e.g., systems may detect potential suspicious information and send it to the isolation systems 30 and/or an analyst user computer systems 20); from a third party (e.g., from another party with which the organization shares information about suspicious information and/or harmful code); and/or from other systems. The suspicious information may be a notification of a suspicious website, a suspicious file sent to a target user computer system 20 of a target user 6, a suspicious file identified by the organization systems, a suspicious program that was installed on a target computer system 20 or other organization system 10, or other suspicious information identified by a target user 6, the organization, the analyst 8, or the like.

Once suspicious information is identified, as illustrated in block 230 of FIG. 3, an analyst 8 may access a virtual container 132 (e.g., a dedicated virtual container 132 for the analyst 8, or the like) on the isolation systems 30. In some embodiments, the virtual container 132 may be pre-set with the virtual environment configuration (e.g., the applications, databases, data, or the like) that may be needed in order to analyze the suspicious information. Alternatively, or additionally, the analyst 8 may set (e.g., create, edit, or the like) the virtual environment configuration before analyzing the suspicious information within the virtual container 132 of the analyst 8. In this way, the analyst 8 may pick and choose the most relevant virtual environment configuration (e.g., applications, operating system, settings, or the like) for the virtual container 132 and/or the suspicious information being analyzed. In some embodiments, the analyst 8 may recreate the virtual environment configuration of the target user computer system 20 of the target 6 that received the suspicious information, of a typical user computer system 20 of a typical user 4 within the organization, of a specific user computer system 20 of a specific type of user 4 that works for a business unit within the organization, or the like.

FIG. 3 further illustrates in block 240, that the analyst 8 analyzes the suspicious information within the virtual container 132 in order to identify any harmful information within the suspicious information. For example, the analyst 8 may access the suspicious website, open the suspicious file, run the suspicious program, or the like. The analyst 8 may investigate and determine what the suspicious information does to the virtual environment (e.g., how the applications, databases, data, or the like within the virtual environment configuration are effected by the suspicious information) when the suspicious information is opened, installed, saved, operated, used, or the like. The analyst 8 may analyze the suspicious information on a one-time basis (e.g., open a program once, run a feature once, or the like) or the analyst 8 may accelerate the analysis of the suspicious information (e.g., accelerate the operation of the program, repeatedly running a feature, or the like). Additionally, or alternatively, the analyst 8 may utilize various other tools when analyzing the suspicious information within the virtual container 132. For example, the tools may include utilizing steganography detection, pattern recognition, natural language processing, time bomb tools (e.g., tool that accelerates use of the suspicious information to a future point in time, simulates that the program has run a specified number of times, or the like).

Block 250 of FIG. 3 illustrates that the analyst 8 and/or the isolation application 37 (e.g., automatically) determines that the suspicious information includes harmful information (e.g., harmful code, or the like) that could infiltrate the organization systems 10, or other systems on the network 2. For example, the analyst 8 may determine that a file being investigated, a website link that is selected, and/or a program that is run (e.g., a first time, on subsequent operations, or the like) may upload malware, a trojan horse, or other harmful code into the virtual environment configuration that the analyst 8 is using within the virtual container 132.

FIG. 3 illustrates in block 255 that the analyst 8 and/or the isolation application 37 may perform an action to mitigate the spread of the harmful information. For example, the analyst 8 and/or isolation application 37 may utilize the hash systems 40 to create a hash for the harmful information and add the hash to a restricted list of harmful hashes. As such, in the future any suspicious information may be hashed and compared to the restricted list of harmful hashes. Should the hash of the new suspicious information meet a hash on the restricted list, the suspicious information may be automatically identified as harmful information without the analyst 8 having to analyze the suspicious information in the isolation systems 30. Other actions may include adding the harmful information directly to a restricted list (e.g., list of website links or URLs, file names, senders of the harmful information, or the like) in order to prevent all of the organization systems 10 (e.g., including user computer systems 20, or the like) from accessing the harmful information. As such, in the future the one or more restricted lists (e.g., hashes list, harmful information list, or the like) may be used to block communications (e.g., e-mails, text messages, application communications, or the like), prevent opening, prevent downloading of, or the like any of the harmful information in the restricted list. In other embodiments, the action may include the analyst 8 and/or the isolation application 37 using a tool to destroy the harmful information. For example, in some embodiments, the virtual container 132 may be discarded (e.g., folded up and/or deleted) to mitigate the chance that the harmful information infiltrates other systems or applications within or outside of the isolation systems 30. Other mitigation actions may include sending notifications to various users, as described below with respect to block 260.

Block 260 of FIG. 3 illustrates that notifications may be sent to users 4 within or outside of the network 2. For example, target users 6 may receive a notification that they may have received harmful information, and in response should take a mitigation action (e.g., remove a program, allow an analyst 8 to access a system to remediate the system, change a username or password, or the like). In other examples, other analysts 8 may be notified of the harmful information in order to allow other analysts 8 to be aware of similar suspicious information within the network 2. Additionally, or alternatively, interested users 4 (e.g., management, auditors, or the like) inside organization may be notified for reporting purposes. Furthermore, notifications may be sent to third-party users and/or third-party systems 50 in order to further mitigate the harmful information outside of the organization (e.g., a consortium of entities may share information to aid in identifying harmful information and/or acceptable information).

Returning to block 270 in Figure, as opposed to identifying harmful information, the analyst 8 and/or isolation system 30 may fail to identify any harmful information in the suspicious information. For example, the analyst 8 may identify that the suspicious information is acceptable information (e.g., safe information, or the like) and does not contain any harmful information.

FIG. 3 further illustrates in block 275 that the analyst 8 and/or the isolation system 30 may provide an indication that the suspicious information is cleared. In some embodiments, when clearing the suspicious information, the analyst 8 and/or isolation systems 30 (e.g., automatically) may hash the suspicious information and the hash may be added to an acceptable information list. As such, any new suspicious information identified in the future may be hashed and compared against the acceptable information list in order to determine that the suspicious information does not need to be analyzed by the analyst 8 in the isolation systems 30 (e.g., bypassing the need for the analysis of the suspicious information). Alternatively, the suspicious information itself (e.g., as opposed the hash) may be added to an acceptable list (e.g., list of website links, file names, senders of the suspicious information, or the like) without hashing. As such, should information received by the organization systems 10 (including the user computer systems 20, or other like systems) be on the acceptable lists (e.g., the acceptable hash list, the acceptable information list, or the like), the organization systems 10 may allow the use of the information without analyzing the information in the isolation systems 30. For example, when the information is on an acceptable list the organization systems 10 may allow the related communications for, allow opening of, allow downloading of, or the like for the suspicious information without having to analyze the suspicious information in the isolation systems 30.

Block 280 of FIG. 3 further illustrates that notifications may be sent to users 4. For example, target users 6 may receive a notification that the suspicious information is cleared and the target user 6 can access the suspicious information (e.g., open the file, click the link, run the program, or the like). In other examples, other analysts 8 may be notified that the suspicious information is cleared in case other analysts 8 are investigating, or may investigate in the future, the same or similar suspicious information. Additionally, or alternatively, interested users 4 inside organization may be notified for reporting. Furthermore, notifications may be sent to third-party users and/or third-party systems 50 in order to further report that the suspicious information has been cleared for access (e.g., a consortium of entities may share information to aid in identifying or clearing harmful code).

The present invention provides improved systems for analyzing suspicious information using an isolation system 30 that may be physically and/or logically separated from other systems on the network 2. Moreover, the present disclosure may utilize virtual containers that may be disposable should harmful information be identified within the virtual containers (e.g., to prevent the harmful information from infecting other containers on the isolation systems 30 and/or other systems on the network 2). Furthermore, non-native applications may be utilized within the virtual containers to analyze the suspicious information to aid in preventing the spread of the harmful information. This approach, and in particular the use of all four of the features discussed herein, provide an improved way for analysts 8 to analyze suspicious information within an isolated environment in a way that reduces the chances of any harmful information within the suspicious information from infiltrating other containers 132 and/or portions of the isolation systems 30, and/or other systems on the networks 2.

FIG. 4 illustrates a process for analyzing suspicious information within a disposable virtual container. Blocks 310, 320, and 330 of FIG. 4 correspond to blocks 220, 230, and 240 of FIG. 3, respectively. As such, block 310 of FIG. 4 illustrates an indication of suspicious information is received, as previously discussed with respect to block 220 of FIG. 3. Moreover, as illustrated in block 320 of FIG. 4, an analyst user 8 accesses a virtual container 132, and in some cases sets-up the virtual environment configuration for the virtual container 132, as previously discussed with respect to block 230 of FIG. 3. The analyst user 8 analyzes the suspicious information within the virtual container 132, as illustrated in block 330 of FIG. 4, and as previously discussed with respect to block 240 of FIG. 3. For example, the analyst user 8 may utilize a first virtual container 132 in order to analyze the suspicious information received.

Block 340 of FIG. 4 illustrates that the harmful information is identified (e.g., by the analyst user 8, automatically in the isolation systems 30, and/or the like) through the analysis of the suspicious information. For example, as previously discussed herein with respect to block 250 in FIG. 3, the analyst 8 may determine that a file being investigated, a website link that is clicked, a program that is run (e.g., a first time, on subsequent runs, or the like), and/or the like may upload malware, a trojan horse, or other harmful code into the virtual environment configuration that the analyst 8 is using within the virtual container 132.

FIG. 4 illustrates in block 350 that the analyst user 8 and/or the isolation system 30 identifies when the harmful information effects the virtual container 132, and stores in a log the operation of the harmful information within the virtual container 132. For example, the log may include the name of the harmful information (e.g., file name, program name, extension, or the like), the organization user 4 or system on the network 2 from which the harmful information was received, the date and time the harmful information was received, the third-party that provided the harmful information, the operation that resulted in the infection of the virtual environment configuration, the program, application, system, or the like that the harmful information infects, a hash of the harmful information, the analyst 8 investigating the suspicious information, the virtual environment configuration of the virtual container 132 used by the analyst 8, or other like information.

Block 360 of FIG. 4 illustrates that when harmful information is identified within the virtual container 132, the virtual container 132 may be discarded. For example, discarding the virtual container 132 may include folding-up (e.g., such that any harmful information within the virtual container 132 cannot escape the virtual container 132) and deleting the virtual container 132 from the isolation systems 30. By discarding the virtual container 132 the system aids in restricting the spread of the harmful information to other virtual containers 132 of other analysts 8, as well as to other systems on the same network 2 and/or on other networks 2. For example, despite the isolation system 30 being physically and/or logically separated from the other systems on the network 2, discarding the virtual container 132 further reduces the chance that any harmful information may spread to other systems on the network 2 or other networks.

FIG. 4 illustrates in block 370 that a second virtual container 132 (e.g., a replacement container 134) is provided to the analyst user 8 to allow the analyst user 8 to continue to analyze the suspicious information or new suspicious information. In some embodiments the replacement virtual container 134 may be automatically set-up with the virtual environment configuration as the previously discarded virtual environment configuration, with the virtual environment configuration preferred by the analyst 8, or the virtual environment configuration may be set-up as desired by the analyst 8. As further illustrated in block 370, when analyzing the original suspicious information (e.g., that resulted in discarding the first virtual container 132) within the second virtual container 132, the first harmful information identified previously may be bypassed. For example, the second virtual container 132 may be set-up to automatically bypass the first harmful information identified by preventing the isolation systems 30 and/or preventing the analyst 8 from access the portion of the suspicious information that resulted in the harmful information being exposed (e.g., prevent a feature of a program to run, preventing a file from being opened, or the like). Alternatively, the analyst user 8 may bypass the first harmful information identified manually (e.g., the analyst 8 will not run the program that resulted in the harmful information infecting the virtual environment configuration).

Block 380 in FIG. 4 illustrates that the analyst user 8 continues to analyze the original suspicious information within the replacement container 134. For example, while harmful information (e.g., first harmful information) may have already been identified by the analyst user 8 in the suspicious information, there may he additional harmful information (e.g., second harmful information, third harmful information, or the like) within the same suspicious information. Consequently, the analyst user 8 may continue to identify potential harmful information within the suspicious information, as previously described herein. Moreover, should additional harmful information (e.g., second, third, fourth, or the like harmful information) be identified the process may return to block 340 until not additional harmful information is identified by the analyst 8.

The present invention provides improved systems for analyzing suspicious information using an isolation system 30 that at least utilizes disposable virtual containers 132. Should harmful information be identified within the disposable virtual containers 132, the virtual containers 132 may be discarded in order to prevent the harmful information from infecting other containers on the isolation systems 30 and/or other systems on the network 2. By discarding a disposable virtual container 132 when it becomes infected with harmful information, the chances that the harmful information may spread to other virtual containers 132 on the isolation systems 30 and/or the systems on the network 2 is reduced. Moreover, because the analysts 8 are able to utilize a replacement virtual container 132 and bypass the originally identified harmful information, the present invention allows analysts 8 to review all of the suspicious information for harmful information to identify additional harmful information that may not have otherwise been identified. The present disclosure increases the ability of analysts 8 to identify harmful information while reducing the potential for the harmful information to infect other applications and/or systems.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other than the order illustrated, may be combined or divided, or may be performed simultaneously. It will also be understood that the blocks of the block diagrams illustrated, in some embodiments, merely provide conceptual delineations between systems, and one or more of the systems illustrated by a block in the block diagrams may be combined or share hardware and/or software with another one or more of the systems illustrated by a block in the block diagrams. Likewise, a component, device, system, apparatus, and/or the like may be made up of one or more components, devices, systems, apparatuses, and/or the like. For example, where a processor is illustrated or described herein, the processor may be made up of a plurality of microprocessors or other processing components which may or may not be coupled to one another. Likewise, where a memory is illustrated or described herein, the memory may be made up of a plurality of memory components which may or may not be coupled to one another.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 16/907,993 | SYSTEM FOR ISOLATED ACCESS AND ANALYSIS OF SUSPICIOUS CODE IN A COMPUTING ENVIRONMENT | Concurrently herewith |
| 16/907,995 | APPLICATION INTERFACE BASED SYSTEM FOR ISOLATED ACCESS AND ANALYSIS OF SUSPICIOUS CODE IN A COMPUTING ENVIRONMENT | Concurrently herewith |
| 16/908,155 | SYSTEM FOR IDENTIFYING SUSPICIOUS CODE IN AN ISOLATED COMPUTING ENVIRONMENT BASED ON CODE CHARACTERISTICS | Concurrently herewith |
| 16/908,150 | SYSTEM FOR ISOLATED ACCESS AND ANALYSIS OF SUSPICIOUS CODE IN A DISPOSABLE COMPUTING ENVIRONMENT USING A USER INTERFACE AND AN AUTOMATED INTELLIGENT SYSTEM | Concurrently herewith |

What is claimed is:

1. A system for isolating and analyzing suspicious information in disposable virtual containers, the system comprising:

one or more memory components storing computer-readable code; and one or more processing components operatively coupled to the one or more memory components, wherein when executed the computer-readable code is configured to cause the one or more processing devices to:

receive an indication of the suspicious information;

allow an analyst user access to a first disposable virtual container in order to analyze the suspicious information;

allow the analyst user to analyze the suspicious information within the first disposable virtual container;

identify the suspicious information includes harmful information;

discard the first disposable virtual container when the harmful information is identified;

allow the analyst user access to a second disposable virtual container; and allow the analyst user to analyze the suspicious information within the second disposable virtual container while bypassing the harmful information when analyzing the suspicious information within the second disposable virtual container in order to allow the analyst user to identify additional harmful information within the suspicious information.

2. The system of claim 1, wherein the second disposable virtual container is a replacement container for the first disposable virtual container.

3. The system of claim 1, wherein discarding the first disposable virtual container comprises folding up and deleting the first disposable virtual container.

4. The system of claim 1, wherein the one or more processing components are further configured to execute the computer-readable code to:

identify the suspicious information fails to include the harmful information; and send a notification to a target user that the suspicious information is cleared when the harmful information fails to be identified.

5. The system of claim 1, wherein the indication of the suspicious information is received from a target user.

6. The system of claim 1, wherein the indication of the suspicious information is received automatically from an organization system.

7. The system of claim 1, wherein the system is an isolation system that provides physical separation and logical separation when analyzing the suspicious information.

8. The system of claim 7, wherein the isolation system is accessed through an application programming interface located on an analyst computer system, on the isolation system, or on an application programing interface system.

9. The system of claim 1, wherein the one or more processing components are further configured to execute the computer-readable code to:

create a plurality of virtual containers for a plurality of analysts, wherein each of the plurality of virtual containers are specific to each of the plurality of analysts.

10. The system of claim 1, wherein the one or more processing components are further configured to execute the computer-readable code to:

create a virtual container when the analyst user accesses the system.

11. The system of claim 1, wherein the one or more processing components are further configured to execute the computer-readable code to:

receive virtual environment configurations from the analyst user for the first disposable virtual container for the suspicious information or automatically based on configurations of a target user computer system of a target user that received the suspicious information.

12. The system of claim 1, wherein the one or more processing components are further configured to execute the computer-readable code to:

implement a mitigation action when the suspicious information is determined to include the harmful information.

13. The system of claim 12, wherein the mitigation action comprises sending a notification to a user when the harmful information is identified.

14. The system of claim 12, wherein the mitigation action comprises requesting removal of the harmful information from a target user computer system, allowing the analyst user access to a target user computer of a target user to remediate the harmful information, requiring a username or password change, notifying other analyst users of the harmful information, notifying other users within an organization of the harmful information, notifying a third-party of the harmful information, blocking a website for the harmful information, preventing future download of the harmful information, or automatically deleting any future communications with the harmful information.

15. A method for isolating and analyzing suspicious information in disposable virtual containers, the method comprising:

receiving, by one or more processing components, an indication of the suspicious information;

allowing, by the one or more processing components, an analyst user access to a first disposable virtual container in order to analyze the suspicious information;

allowing, by the one or more processing components, the analyst user to analyze the suspicious information within the first disposable virtual container;

identifying, by the one or more processing components, the suspicious information includes harmful information;

discarding, by the one or more processing components, the first disposable virtual container when the harmful information is identified;

allow, by the one or more processing components, the analyst user access to a second disposable virtual container; and allow, by the one or more processing components, the analyst user to analyze the suspicious information within the second disposable virtual container while bypassing the harmful information when analyzing the suspicious information within the second disposable virtual container in order to allow the analyst user to identify additional harmful information within the suspicious information.

16. The method of claim 15, wherein the second disposable virtual container is a replacement container for the first disposable virtual container.

17. A computer program product for isolating and analyzing suspicious information in disposable virtual containers, the computer program product comprising at least one non-transitory computer-readable medium having computer-readable program code portions embodied therein, the computer-readable program code portions comprising:

an executable portion configured to receive an indication of the suspicious information;

an executable portion configured to allow an analyst user access to a first disposable virtual container in order to analyze the suspicious information;

an executable portion configured to allow the analyst user to analyze the suspicious information within the first disposable virtual container;

an executable portion configured to identify the suspicious information includes harmful information;

an executable portion configured to discard the first disposable virtual container when the harmful information is identified;

an executable portion configured to allow the analyst user access to a second disposable virtual container; and an executable portion configured to allow the analyst user to analyze the suspicious information within the second disposable virtual container while bypassing the harmful information when analyzing the suspicious information within the second disposable virtual container in order to allow the analyst user to identify additional harmful information within the suspicious information.

18. The system of claim 1, wherein the harmful information is bypassed automatically within second disposable virtual container to allow the analyst user to identify the additional harmful information.

19. The system of claim 1, wherein the harmful information is bypassed manually by the analyst within the second disposable virtual container to allow the analyst user to identify the additional harmful information.

* * * * *